Patented June 1, 1926.

1,587,004

UNITED STATES PATENT OFFICE.

AUGUST LEOPOLD LASKA AND ARTHUR ZITSCHER, OF OFFENBACH-ON-THE-MAIN, GERMANY, ASSIGNORS TO CORPORATION OF CHEMISCHE FABRIK GRIESHEIM-ELEKTRON, OF FRANKFORT-ON-THE-MAIN, GERMANY.

AZO DYESTUFFS AND PROCESS OF MAKING SAME.

No Drawing. Application filed March 31, 1925, Serial No. 19,736, and in Germany June 7, 1924.

The invention relates to new azo dyestuffs and a process of making same, said dyestuffs having probably the general formula:

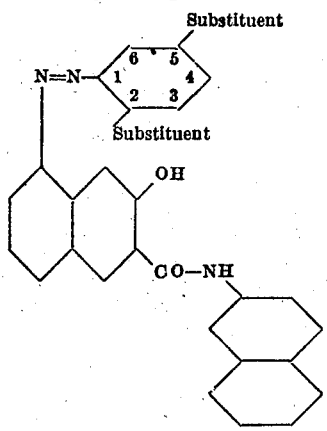

wherein at least one substituent is a halogen atom, which are when dry yellowish red to claret-red powders soluble in sulfuric acid to a violet solution, yielding upon reduction with stannous chloride an anilin-derivative of the formula:

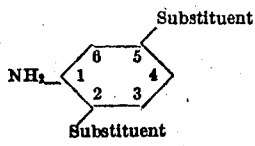

and β-naphthalid of 1-amino-2-hydroxy-naphthalene-3-carboxylic acid, adapted for the production of valuable color lakes, when mixed with the usual substrata, and yielding when produced on the fiber, dyeings, distinguished by clearness of shade and excellent fastness, particularly to kier-boiling.

Under the name "substituent" in the above mentioned formula we include substituents such as halogens, alkyl-, O-alkyl-, O-aryl groups, provided that at least one substituent is a halogen atom.

The new dyestuffs may be obtained by combining any anilin-derivative, substituted in the 2 and 5 positions to the aminogroup and containing in these positions at least one halogen atom, such as 4-chloro-1.2-toluidin, 4-chloro-1.3-toluidin, 4-chloro-1.2-anisidin, 4-chloro-1.3-anisidin and the corresponding phenetidins, 2.5-dichloroanilin, 4-chloro-2-amino-diphenylether, with β-naphthalid of 2.3-hydroxynaphthoic acid. Especially valuable are the dyestuffs having the general formula:

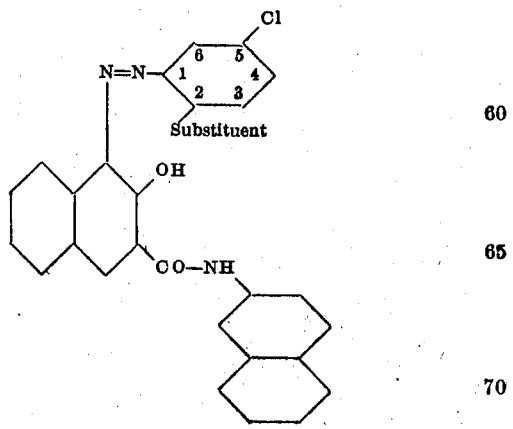

which may be obtained by combining anilin-derivatives of the formula:

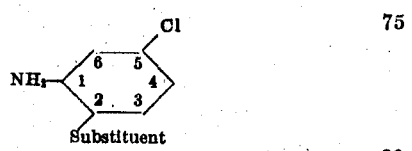

with β-naphthalid of 2.3-hydroxynaphthoic acid.

The following examples illustrate the invention, the parts being by weight and all temperatures in centigrade degrees.

Example 1.

14.5 parts of 4-chloro-1.2-toluidin are dissolved with dilute hydrochloric acid, cooled down to +5°, diazotized by pouring in a solution of 7 parts of sodium nitrite in 30 parts of water and combined with a solution of 31.3 parts of β-naphthalid of 2.3-hydroxynaphthoic acid, dissolved in a dilute caustic soda solution, prepared from 40 parts of caustic soda solution of 36° Bé. and 500 parts of water, and mixed with a quantity of sodium acetate which is necessary to combine with the excess of the mineral acid in the diazo solution. When the combination is complete, the precipitate is filtered off. The dyestuff, having probably the formula:

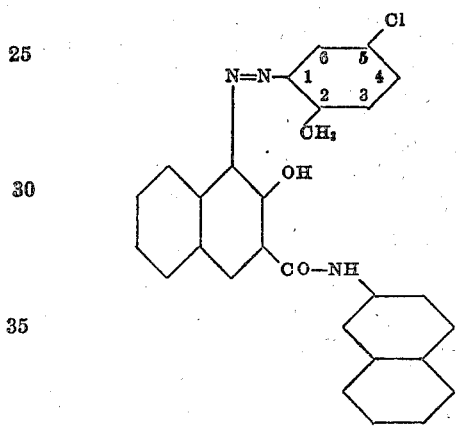

is when dry a brilliant red powder soluble in concentrated sulfuric acid to a reddish violet solution and precipitated therefrom with water in red flakes. For the production of color lakes it is mixed, preferably in the form of a paste, with the substrata usual for the production of color lakes and gives bluish red lakes of an excellent fastness.

Example 2.

Cotton yarn, which has been well boiled and dried, is impregnated with a solution of 3 gr. of β-naphthalid of 2.3-hydroxynaphthoic acid, 9 cc. of caustic soda solution of 34° Bé. and 8 cc. of Turkey red oil per liter, well wrung out and, without being dried, developed, with a diazosolution, neutralized with chalk and containing 2.9 gr. of 4-chloro-1.2-toluidin or 4.4 gr. of 4-chloro-2-amino-diphenylether, per liter, rinsed and soaped.

In this manner with both aminobases clear red shades of a very good fastness to kier-boiling are obtained.

The new dyestuffs may also be produced by the printing process according to one of the usual methods.

With other corresponding halogenated aminobases the process may be conducted in a similar manner.

Now what we claim and desire to secure by Letters Patent is the following:

1. As new compounds the azodyestuffs, having probably the general formula:

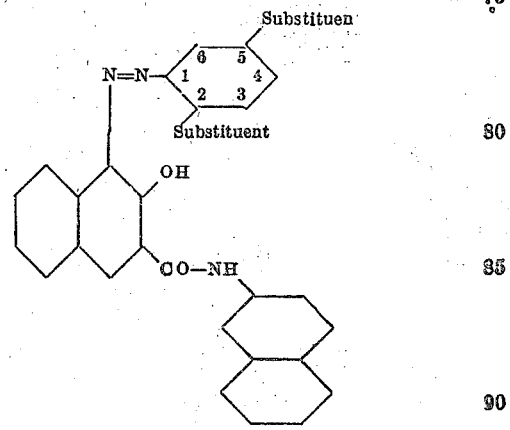

wherein at least one substituent is a halogen atom, which are when dry yellowish red to claret-red powders, soluble in sulfuric acid to a violet solution, yielding upon reduction with stannous chloride an anilin-derivative of the formula:

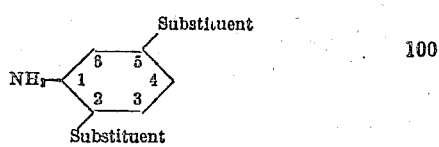

and β-naphthalid of 1-amino-2-hydroxynaphthalene-3-carboxylic acid, adapted, when mixed with the usual substrata, for the production of valuable color lakes and yielding, when produced on the fiber, dyeings, which are distinguished by clearness of shade and excellent fastness, particularly to kier-boiling.

2. The process of making new azodyestuffs consisting in combining any diazotized anilin-derivative, substituted in 2 and 5 positions to the aminogroup and containing at least one halogen atom in these positions, with β-naphthalid of 2.3-hydroxynaphthoic acid.

3. Materials dyed with the new azodyestuffs of claim 1, said dyestuffs being produced on the fiber of the material.

4. As new compounds the azodyestuffs having probably the general formula:

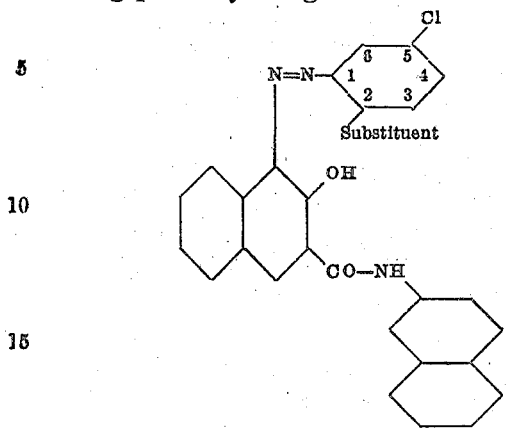

which are when dry yellowish red to claret-red powders, soluble in sulfuric acid to a violet solution, yielding upon reduction with stannous chloride an anilin-derivative of the formula:

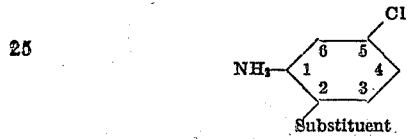

and β-naphthalid of 1-amino-2-hydroxy-naphthalene-3-carboxylic acid, adapted, when mixed with the usual substrata, for the production of valuable color lakes and yielding, when produced on the fiber, dyeings, which are distinguished by clearness of shade and excellent fastness, particularly to kier-boiling.

5. The process of making new azodyestuffs consisting in combining any diazotized anilin-derivative of the formula:

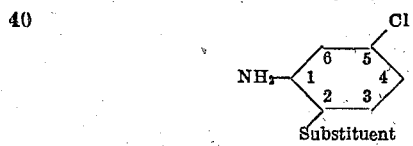

with β-naphthalid of 2.3-hydroxynaphthoic acid.

6. Materials dyed with the new azodyestuffs of claim 4, said dyestuffs being produced on the fiber of material.

7. As a new compound the azodyestuff having probably the formula:

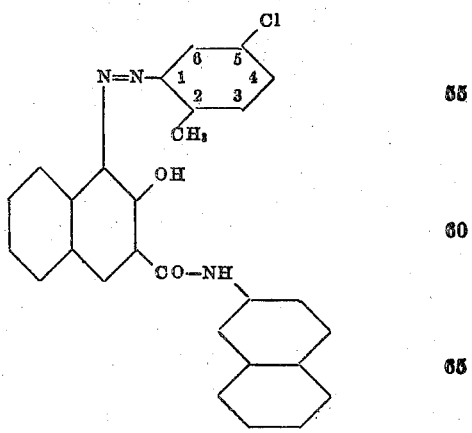

which is when dry a red powder soluble in sulfuric acid to a reddish violet solution, yielding upon reduction with stannous chloride 4-chloro-1.2-toluidin and β-naphthalid of 1-amino-2-hydroxy-naphthalene-3-carboxylic acid, adapted, when mixed with the usual substrata, for the production of valuable color lakes and yielding, when produced on the fiber, a dyeing, which is distinguished by clearness of shade and excellent fastness, particularly to kier-boiling.

8. The process of making a new azodyestuff, consisting in combining diazotized 4-chloro-1.2-toluidin with β-naphthalid of 2.3-hydroxynaphthoic acid.

9. Materials dyed with the new dyestuff of claim 7, said dyestuff being produced on the fiber of the material.

In testimony, that we claim the foregoing as our invention, we have signed our names, this 18th day of March 1925.

AUGUST LEOPOLD LASKA.
ARTHUR ZITSCHER.